United States Patent
Lei

(10) Patent No.: US 8,233,604 B2
(45) Date of Patent: Jul. 31, 2012

(54) AUTOMATED CALL ROUTING BASED ON AN ACTIVE PRESENCE PROFILE

(75) Inventor: Io Tong Lei, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 12/211,431

(22) Filed: Sep. 16, 2008

(65) Prior Publication Data

US 2010/0067679 A1  Mar. 18, 2010

(51) Int. Cl.
  *H04M 3/42* (2006.01)
  *H04W 24/00* (2009.01)
(52) U.S. Cl. .............. 379/201.02; 455/456.1
(58) Field of Classification Search ........... 379/201.02; 455/456.1
  See application file for complete search history.

(56) References Cited

U.S. PATENT DOCUMENTS

| | | |
|---|---|---|
| 2003/0154293 A1 | 8/2003 | Zmolek |
| 2004/0003046 A1* | 1/2004 | Grabelsky et al. ............ 709/206 |
| 2004/0203664 A1 | 10/2004 | Lei et al. |
| 2004/0205175 A1 | 10/2004 | Kammerer |
| 2004/0267887 A1 | 12/2004 | Berger et al. |
| 2005/0141687 A1 | 6/2005 | Ozugur et al. |
| 2007/0153997 A1 | 7/2007 | Shang |
| 2009/0172564 A1* | 7/2009 | Fish .............................. 715/753 |

FOREIGN PATENT DOCUMENTS

WO  2007071920  6/2007

OTHER PUBLICATIONS

Rosenberg et al.; "SIP Extensions for Presence; draft-rosenberg-impp-presence-00.txt" IETF Standard-Working-Draft, Internet Engineering Task Force, IETF, Ch, Jun. 15, 2000, XP015034653; ISSN: 0000-0004; p. 7, line 1—p. 15, last line. 74 pages.
Rosenberg et al.; "Models for Intra-Domain Presence Federation; draft-ietf-simple-intradomain-federation-00.txt" IETF Standard-Working-Draft, Internet Engineering Task Force, IETF, Ch, vol. simple, Feb. 21, 2008, XP015053870; ISSN: 0000-0004; p. 12, section 5.2.2; p. 17, section 6.1-p. 13, section 6.1.2; 36 pages.
Roach et al.; "A Session Initiation Protocol (SIP) Event Notification Extension for Resource Lists; rfc4662.txt"; IETF Standard, Internet Engineering Task Force, IETF, Ch, Aug. 1, 2006, XP015047413; ISSN: 0000-0003; p. 3, line 1-p. 5, last line. 37 pages.
Presence Aggregation in Endpoints, Jan. 15, 2003, Technologie-Zentrum Informatik, 10 pages.
Corebridge Solutions, 2007, www.corebridge.com, 2 pages.

* cited by examiner

*Primary Examiner* — Rasha Al Aubaidi
(74) *Attorney, Agent, or Firm* — Schmeiser Olsen & Watts; John Pivnichny

(57) ABSTRACT

A method and system for automatically routing a call to an identity of multiple identities based on an active presence profile. A subscription message is sent to a user's contact addresses. The contact addresses include identities of the user and indicators of remote servers that manage real time communication systems. A presence document that includes a presence status of a first identity of the user is received. The presence status indicates that the first identity is offline. A registration message is issued to a remote server, resulting in a call redirection from the first identity to a second identity. The second identity is included in an active presence profile and is associated with a computing system that receives the redirected call. If multiple presence profiles of the user are active, a matching algorithm selects a contact address of one of the active presence profiles to determine the call redirection.

22 Claims, 8 Drawing Sheets

```
<HyperIdentity ID = "Tim">
  <address-book>
    <entry>
      <name>Tim_1</name>
      <contact>Tim_1@sip1.com.au</contact>
      <email>Tim_1@email1.com.au</email>
    </entry>
    <entry>
      <name>Tim_2</name>
      <contact>Tim_2@sip2.com.au</contact>
      <email>Tim_2@email2.com.au</email>
    </entry>
    <entry>
      <name>Tim_3</name>
      <contact>Tim_3@sip3.com.au</contact>
      <email>Tim_3@email3.com.au</email>
    </entry>
  </address-book>
</HyperIdentity>
```

*FIG. 3*

AUTOMATED CALL ROUTING BASED ON AN ACTIVE PRESENCE PROFILE

FIELD OF THE INVENTION

The present invention relates to a data processing method and system for automatically routing a call to an identity of multiple identities of a callee based on the callee's active presence profile, and more particularly to a technique for automatically redirecting a call destined for a non-active identity of a callee to an active identity of the callee.

BACKGROUND OF THE INVENTION

Conventional presence-based real time interactive messaging provided by vendors and service providers (e.g., Google Talk® (a.k.a. GTalk), ICQ®, MSN® Messenger, etc.) have created a "presence islands" landscape in which it is difficult to manage and interoperate an end user's multiple identities. A conventional "follow-me" feature on a messaging product that allows incoming messages to be routed to a phone number or address is inconvenient for the end user who is required to manually select or enter the phone number or address. Thus, there exists a need to overcome at least one of the preceding deficiencies and limitations of the related art.

SUMMARY OF THE INVENTION

In first embodiments, the present invention provides a computer-implemented method of automatically routing a call to an identity of multiple identities of an end user based on an active presence profile of the end user. A computing system sends a subscription message to contact addresses of an end user. The contact addresses include identities of the end user and indicators of remote server computing systems that manage a plurality of presence-based real time interactive communication systems. Each remote server computing system is remote from the computing system that sends the subscription message. A presence document that includes a presence status of a first identity of the end user's multiple identities is received. The computing system determines that the presence status indicates that the first identity of the end user is offline or away. In response, a registration message is issued to the remote server computing system, thereby resulting in a redirection of any call destined for the first identity to a second identity of the end user's multiple identities. The second identity is included in the active presence profile of the end user and is associated with the computing system. After issuing the registration message and as a result of the redirection, the computing system receives the call.

In second embodiments, the present invention provides a computer-implemented method of automatically routing calls to an identity of an end user based on an active presence profile selected from multiple active presence profiles. A computing system managing a presence-based real time interactive communication system retrieves a first set of details of a first profile, a second set of details of a second profile, and a third set of details of a third profile. The first profile describes attributes of a first identity of multiple identities of the end user. The second profile describes attributes of a second identity of the end user's multiple identities. The third profile describes attributes of a third identity of the end user's multiple identities. The second profile and the third profile are active presence profiles of the end user. After retrieving the sets of details, the first set of details is compared to the second set of details, resulting in a first measure of similarity between the first set of details and the second set of details. After retrieving the sets of details, the first set of details is compared to the third set of details, resulting in a second measure of similarity between the first set of details and the third set of details. The computing system determines that the first measure is greater than the second measure, thereby indicating that the similarity between the first set of details and the second set of details is greater than the similarity between the first set of details and the third set of details. In response to determining that the first measure is greater than the second measure, a contact address included in the second profile is retained in a storage device and a contact address included in the third profile is removed from the storage device. The computing system routes a call originally destined for the first identity to the second identity via the contact address included in the second profile.

Systems, computer program products, and processes for supporting computing infrastructure corresponding to the above-summarized methods are also described herein.

BRIEF DESCRIPTION OF THE DRAWINGS

FIG. 3 depicts an example of a hyperidentity group identified in the process of FIGS. 2A-2B, in accordance with embodiments of the present invention.

DETAILED DESCRIPTION OF THE INVENTION

Overview

Figure 1:
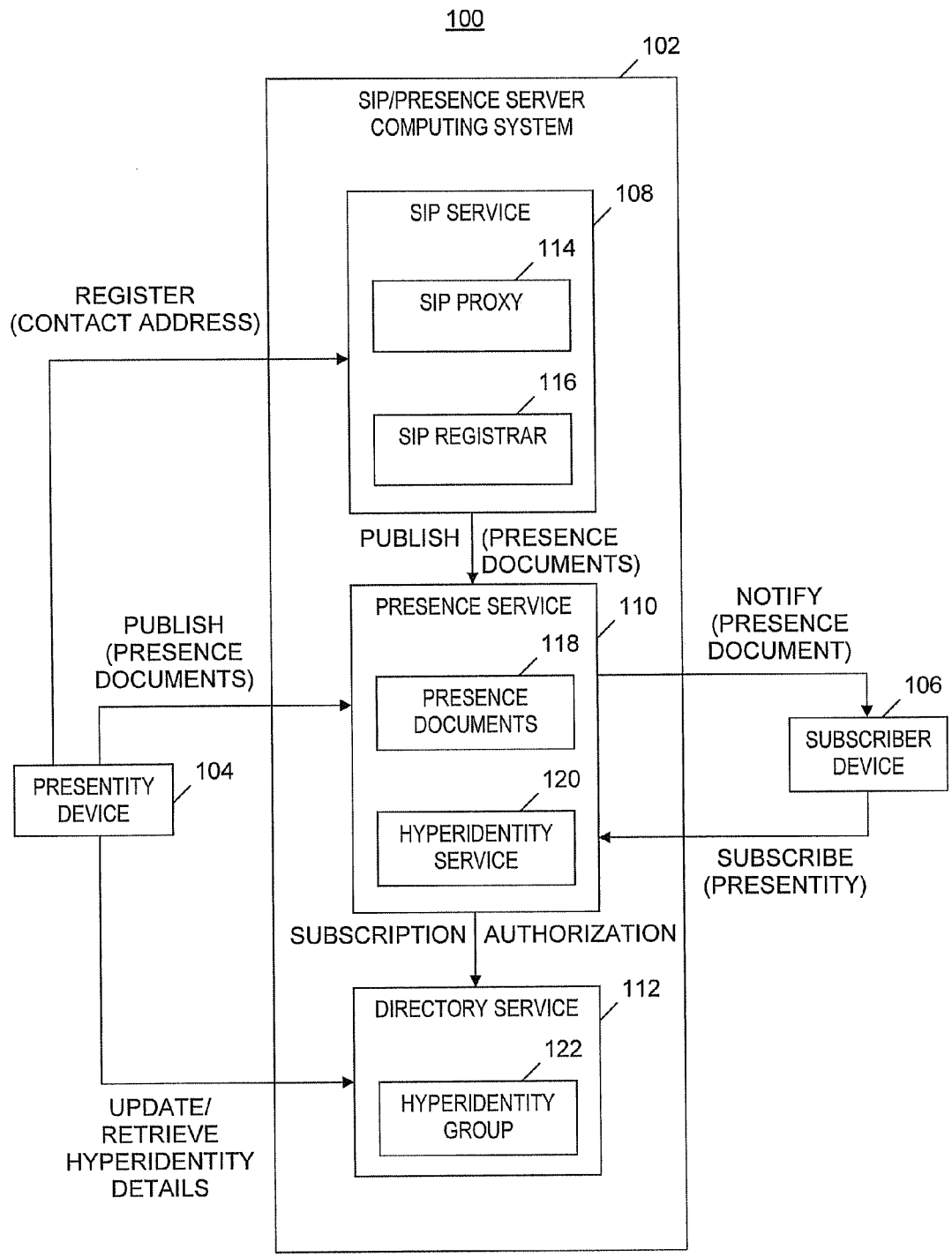
FIG. 1 is a block diagram of a system for automatically routing calls to one identity of a callee's multiple identities based on the callee's active presence profile, in accordance with embodiments of the present invention.

The present invention provides automated call routing based on the end user's active presence profile. Open standard protocols such as Session Initiation Protocol (SIP), a presence service and a buddy list may be utilized by the present invention. A new component that may be layered on top of the presence service interrogates the buddy list and SIP services to facilitate the call routing automation. The automated call routing feature of the present invention allows an end user to be reachable by real-time communication messages destined for multiple presence spaces regardless of the presence space (e.g., Sametime®, GTalk, Yahoo® Messenger, etc.) onto which he or she is currently logged. The incoming messages are routed to an active presence profile of the end user. For example, if a person is currently active in GTalk, then incoming calls destined for the person's Second Life® account are routed to GTalk automatically.

The invention disclosed herein may save an end user from having to manually update a "follow-me" address each time the end user switches to another presence profile. Further, the present invention may provide a complete, self-managed call routing feature that is transparent to both the caller and callee. The call routing transparency to the caller may provide privacy protection to the callee.

Definitions

The terms listed in this section are used herein and are defined below.

Contact address: an address for communicating with an end user of a presence-based real time interactive communication system (e.g., an instant messaging system, Voice Over Internet Protocol (VoIP) system, or Internet Protocol Multimedia Subsystem (IMS)), where the contact address includes an identity that identifies the end user and an indication of a server computing system that manages the presence-based real time interactive communication system. Hereinafter, a presence-based real time interactive communication system is also referred to as a real time interactive communication system.

End user (a.k.a. user): a person, a group of persons, or an entity whose identity receives (or is the intended recipient of) a communication (i.e., a message) from another person, group of persons, or entity via a device and a real time interactive communication system, where the real time interactive communication system identifies the end user by the identity. An end user whose identity receives a communication or is the intended recipient of a communication is also referred to herein as a callee.

Presence information: information that includes a presence status of an end user's identity, and may also include descriptions of activities of an end user, a timestamp indicating a start time of a period of time during which an end user's identity is idle on a device being used in a real time interactive communication system, a type of place in which an end user is utilizing the device, and/or a geographic location of the device.

Presence service: a service that receives, stores and distributes presence information.

Presence status: an indication of an availability of an end user's identity to receive a communication via a real time interactive communication system (e.g., online (a.k.a. active), offline, or away) As used herein, a presence status of "away" refers to an end user who is online but is idle for a period of time (e.g., no mouse or keyboard activities).

Presentity: a presence entity that provides presence information to a presence service. A presentity is a human or a group of humans that are willing to provide presence information to users of a real time interactive communication system. A presentity that is a group of humans appears to be one entity to users of a real time interactive communication system. A presentity is an end user of a real time interactive communication system.

Active Presence Profile-Based Automated Call Routing System

FIG. 1 is a block diagram of a system for automatically routing calls to one identity of a callee's multiple identities based on the callee's active presence profile, in accordance with embodiments of the present invention. System 100 includes a SIP/Presence server computing system 102 (a.k.a. SIP server), a device 104 (a.k.a. presentity device) associated with a presentity, and a subscriber device 106. In this section, the presentity associated with device 104 is referred to simply as "the presentity." SIP server 102 includes a SIP service 108, a presence service 110 and a directory service 112. SIP service 108 includes a SIP proxy 114 and a SIP registrar 116. Presence service 110 includes presence documents 118 and a hyperidentity service 120. Directory service includes a hyperidentity group 122.

SIP service 108 is a SIP system that manages call initiation, session establishment, and device address registration. SIP proxy 114 routes, forwards, redirects and forks SIP messages. SIP proxy 114 also responds to a SIP INVITE message. SIP registrar 116 is responsible for registering a SIP client device's contact address (e.g., Internet Protocol (IP) address) to a Uniform Resource Identifier (URI) (e.g., a URI having a sip: or tel: scheme name).

Presence service 110 is a presence system that allows end users to publish their presence statuses as well as subscribe to each others' presence statuses. The presence status (i.e., status included in presence information) of each end user is encapsulated in a presence document included in presence documents 118. Presence service 110 receives and sends presence documents 118 between client devices such as presentity device 104 and subscriber device 106. Each of the presence documents 118 is based on the Presence Information Data Format (PIDF) standard and other proposed extensions such as Rich Presence Extensions to the Presence Information Data Format (RPID). The PIDF standard is published by the Internet Engineering Task Force (IETF) as RFC3863. The RPID extension the PIDF standard is published by the IETF as RFC4480. Hereinafter, the PIDF standard and the proposed extensions such as RPID are referred to collectively as the PIDF/RPID standard. Each presence document is used to describe multiple aspects of presence information associated with the presentity such as (1) device status (i.e., status of a presentity device; e.g., open or closed), (2) an end user's activities (e.g., on the phone, away, appointment, holiday, meal, etc.), (3) a timestamp indicating the start time of the end user being idle on the device, (4) type of place (e.g., home, office, quiet, noisy, airport, bus, etc.), and (5) location (e.g., Global Positioning System (GPS) coordinates). In the PIDF standard, a device status of "open" is equivalent to "online" and a device status of "closed" is equivalent to "offline."

Figure 2A:
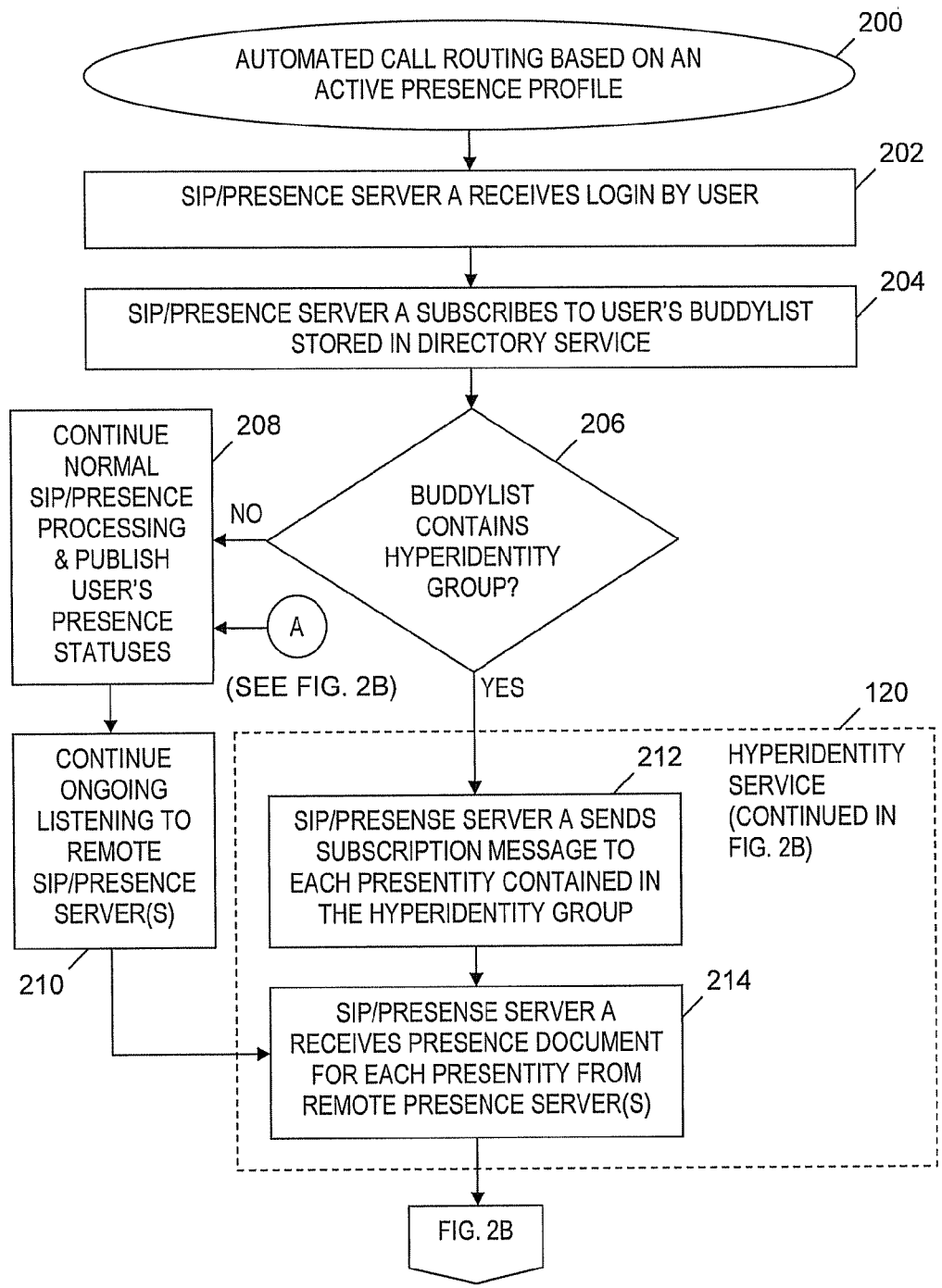
FIGS. 2A-2B depict a flowchart of an active presence profile-based automatic call routing process implemented by the system of FIG. 1, in accordance with embodiments of the present invention.
Figure 2B:
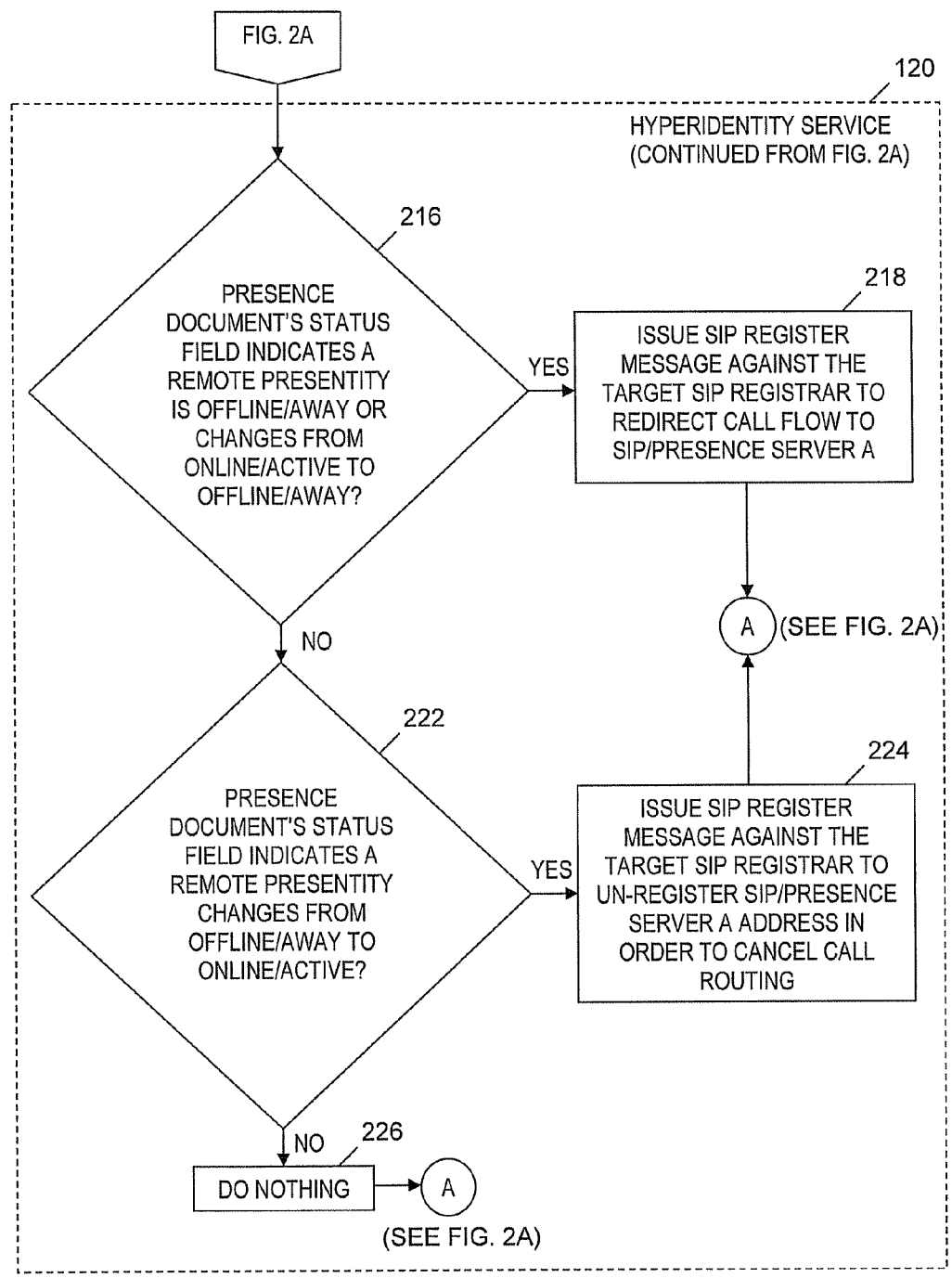
Figure 4:
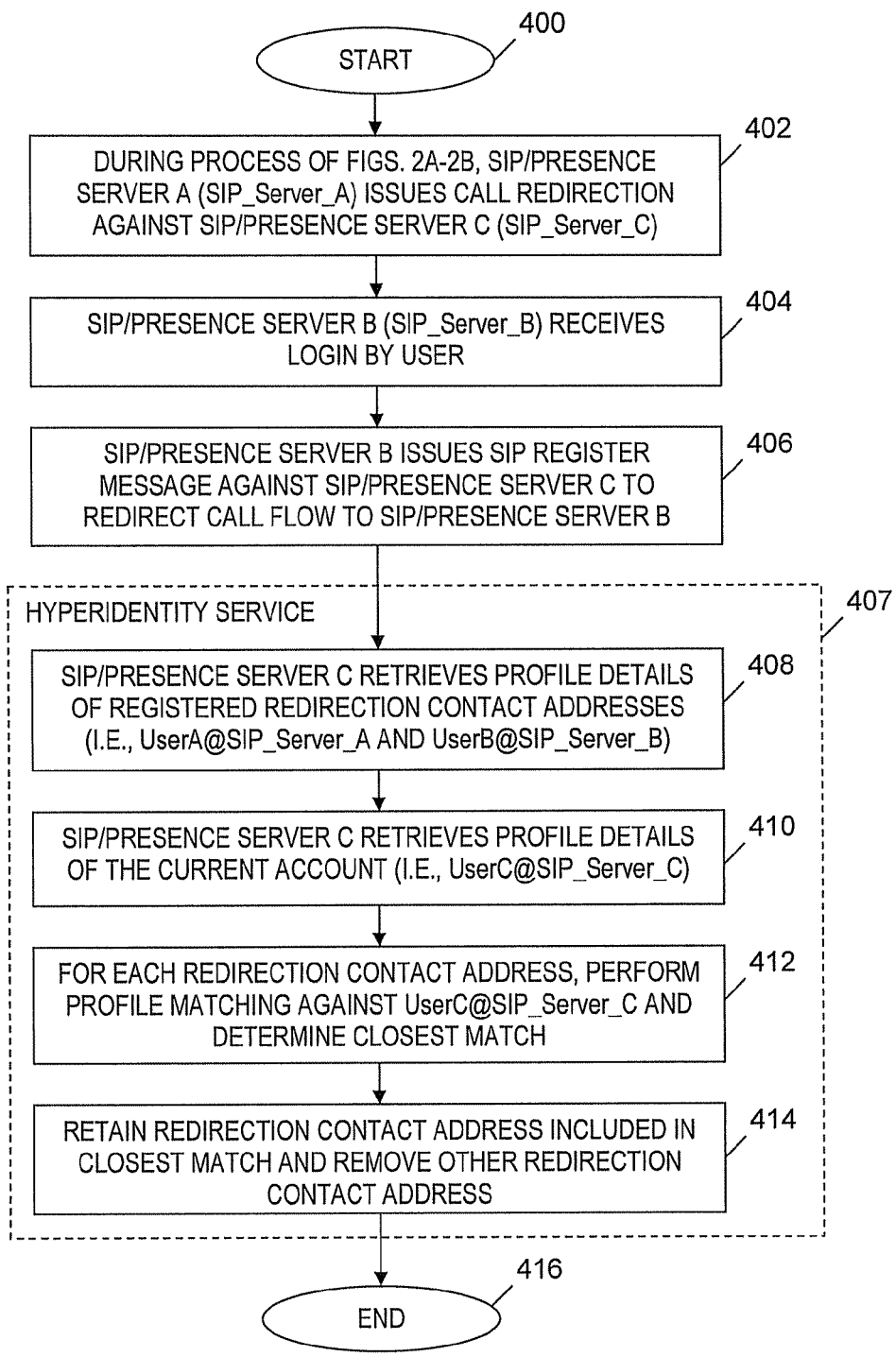
FIG. 4 is a process of automatically routing calls to an identity selected by an active presence profile matching algorithm implemented in the system of FIG. 1, in accordance with embodiments of the present invention.

Hyperidentity service 120 includes the core processing logic that performs the method of the present invention, as shown in FIGS. 2A-2B and FIG. 4.

Directory service 112 is a system that includes data storage that contains a buddy list (i.e., a contact list) for an authorized end user (e.g., the presentity). The buddy list identifies contacts (i.e., people and/or entities) with whom the authorized end user may communicate via a real time interactive communication system such as instant messaging. The aforementioned authorized end user associated with the buddy list is also referred to herein as the owner. The buddy list may list groups that categorize the contacts. The groups in the buddy list may be, for example, family members, friends, work colleagues, etc. In the present invention, a special group name is reserved in directory service 112. As used herein, the special group name is "hyperidentity" (i.e., hyperidentity group 122 is the group that is included in the buddy list and that has the special group name of "hyperidentity"). The present invention contemplates that another name may be substituted for "hyperidentity."

Directory service 112 allows a device (e.g., presentity device 104) associated with a presentity who is the authorized end user to set up and update information in hyperidentity group 122. Hyperidentity group 122 includes a list of all user profiles (a.k.a. presence profiles) belonging to the authorized end user. Each user profile in hyperidentity group 122 includes a contact address of the authorized end user. For example, the contact address included in hyperidentity group 122 may include the end user's GTalk identity, Second Life® identity, Sametime® identity or MSN® Messenger identity.

In one embodiment, hyperidentity group 122 is represented by Extensible Markup Language (XML) to allow future extensions. For example, a hyperidentity group that is represented in XML and that is associated with an end user identified as "Tim" is shown in FIG. 3.

In one embodiment, directory service 112 and hyperidentity group 122 are implemented using an XML Configuration Access Protocol (XCAP) service. XCAP is a protocol that allows a user or application to manipulate an XML document stored in a Hypertext Transfer Protocol (HTTP) server, where the format of the XML document is extensible. In another embodiment, directory service 112 utilizes database storage to store the hyperidentity group 122.

Presentity device 104 is a SIP device that registers its contact address on SIP service 108, publishes its presence status to presence service 110, and stores, updates and retrieves details of hyperidentity group 122 included in directory service 112.

Subscriber device 106 is a SIP device that subscribes to presence service 110 as a watcher on the presence information associated with the presentity. As used herein, a watcher requests presence information about a presentity from a presence service (e.g., requests that the presence service provide an immediate notification of any change in the presence information of a presentity).

Active Presence Profile-Based Automated Call Routing Process

FIGS. 2A-2B depict a flowchart of an active presence profile-based automatic call routing process implemented by the system of FIG. 1, in accordance with embodiments of the present invention. The process for automatically routing a call based on an active presence profile starts at step 200. In step 202, SIP server 102 (see FIG. 1) (a.k.a. SIP server A) receives a login by an end user to a real time communications system. In step 204, SIP server A initiates subscribing to the end user's buddy list stored in directory service 112 (see FIG. 1). The subscribing in step 204 is performed by issuing a subscribe command that includes sending a request to contact addresses included in the end user's buddy list to determine the status of the identities associated with the contact addresses (e.g., to determine if the identities are online, offline or away).

If directory service 112 (see FIG. 1) determines in step 206 that the end user's buddy list does not include hyperidentity group 122, then the process of FIGS. 2A-2B continues with step 208. In step 208, normal SIP/presence processing by SIP server A continues and presence statuses of users are published by presence service 110 (see FIG. 1). In step 210, ongoing listening to one or more remote SIP/presence servers (not shown in FIG. 1) is continued by SIP server A. The one or more remote SIP/presence servers are remote to SIP server 102 (see FIG. 1) and have components analogous to the components of SIP server 102 (see FIG. 1).

Returning to step 206, if directory service 112 (see FIG. 1) determines that the end user's buddy list includes hyperidentity group 122, then in step 212 SIP server A sends a subscription message to each presentity whose presence profile is contained in hyperidentity group 122. For example, SIP server A sends a subscription message to presentity device 104 (see FIG. 1) in step 212. Step 214 follows step 212 and step 210. Step 212 and step 214 are performed by hyperidentity service 120.

In step 214, presence service 110 of SIP server A receives one or more presence documents, each presence document being received from one of the remote SIP/presence server(s). The one or more presence documents are associated with one or more remote presentities in a one-to-one correspondence. The one or more remote presentities are associated with the one or more remote SIP/presence servers in a one-to-one correspondence. Each of the presence documents is received in response to a subscription message sent in step 212. Step 216 of FIG. 2B follows step 214.

For each presence document received in step 214, if SIP server A determines in step 216 that the presence document's status field indicates that the remote presentity associated with the presence document (1) is offline or away, or (2) changes status from online (i.e., active) to offline or away, then the Yes branch of step 216 is taken and step 218 is performed. For example, if the remote presentity logs off its corresponding SIP/presence server (i.e., a SIP/presence server remote from SIP server A), then the Yes branch of step 216 is taken. In step 218, SIP server A issues a SIP REGISTER message against a SIP registrar of a target SIP server. As used herein, a target SIP server is defined as the remote SIP/presence server associated with the remote presentity whose address is the original destination of a call. The issuance of the SIP REGISTER message results in an automatic redirection of call flow from the target SIP server to SIP server A. Following step 218, the process of FIGS. 2A-2B is repeated starting at step 208 of FIG. 2A.

Returning to step 216, if SIP server A determines that the presence document's status field indicates that the remote presentity associated with the presence document (1) is not offline or away, and (2) has not changed status from online (i.e., active) to offline or away, then step 222 is performed.

If SIP server A determines in step 222 that the presence document's status field indicates that the remote presentity associated with the presence document changes status from offline or away to online (i.e., active), then the Yes branch of step 222 is taken and step 224 is performed. For example, if the remote presentity logs on to its corresponding SIP/presence server (i.e., a SIP/presence server remote from SIP server A), then the Yes branch of step 222 is taken. In step 224, SIP server A issues a SIP REGISTER message against the SIP registrar of the remote SIP/presence server (i.e., the target SIP server) associated with the remote presentity. The issuance of the SIP REGISTER message results in un-registering the address of SIP server A in order to cancel the redirection of call flow from the target SIP server to SIP server A. Following step 224, the process of FIGS. 2A-2B is repeated starting at step 208 of FIG. 2A.

Returning to step 222, If SIP server A determines that the presence document's status field indicates that the remote presentity associated with the presence document does not change status from offline or away to online (i.e., active), then the hyperidentity service 120 (see FIG. 1) performs no call flow redirection or cancellation of call flow redirection in step 226. Moving along the No branch of step 222 to step 226 means that presence information of a remote presentity has changed, where the changed presence information is other than a change in online status that is checked in steps 216 and 222. For example, the presence information of a remote presentity may change the type of place associated with the remote presentity from airport to office. Following step 226, the process of FIGS. 2A-2B is repeated starting at step 208 of FIG. 2A.

Steps 216, 218, 222, 224 and 226 are performed by hyperidentity service 120 (see FIG. 1).

FIG. 3 depicts an example of a hyperidentity group identified in the process of FIGS. 2A-2B, in accordance with embodiments of the present invention. Hyperidentity group 300 includes user profiles for an individual identified as "Tim." Each of the user profiles in hyperidentity group 300 includes a name, contact address and email address. Hyperidentity group 300 is an example of the hyperidentity group identified in step 206 of FIG. 2A.

Automated Call Routing With Multiple Active Presence Profiles

FIG. 4 is a process of automatically routing calls to an identity selected by an active presence profile matching algorithm implemented in the system of FIG. 1, in accordance with embodiments of the present invention. Execution of the profile matching algorithm in the process of FIG. 4 automatically selects the most appropriate call redirection address if multiple call redirection addresses are present due to multiple user profiles being active. The profile matching algorithm requires extending the profile details recorded in hyperidentity group 122 (see FIG. 1). For example, each profile within hyperidentity group 122 (see FIG. 1) is represented in XML format, which is extendable, thereby allowing the profile details in hyperidentity group 122 to be extended as required by the profile matching algorithm.

In one embodiment, the profile matching algorithm is based on totaling the number of exact matches between corresponding data elements in different user profiles. For example, a "PC Games" attribute in a data element labeled "interest" in a first XML document representing a first profile exactly matches a "PC Games" attribute in a data element labeled "interest" in a second XML document representing a second profile.

In another embodiment, the profile matching algorithm is based on a fuzzy algorithm that is utilized to calculate a matching score. For example, a fuzzy algorithm may determine that "Game Player" compared to "Fitness Trainer" has a higher matching score than "Game Player" compared to "IT Architect."

The ability to select redirection contact addresses based on the profile matching algorithm disclosed herein may be advantageously applied to virtual education/tutoring and professional support services/life support hotlines. For example, a hyperidentity group can be set up for a group of virtual lecturers/tutors, where each lecturer/tutor is associated with a detail profile that includes what subjects he or she is teaching, what languages he or she speaks, etc. A student attempting to contact a first lecturer/tutor who is not online will be automatically routed to a second lecturer/tutor whose profile details include attributes that most closely match the first lecturer/tutor's.

The process for automatically routing calls to an identity selected by an active presence profile matching algorithm begins at step 400. User B and User C are offline. During the process of FIGS. 2A-2B and prior to step 402, User A logs into SIP Server 102 (see FIG. 1) (a.k.a. SIP Server A or SIP_Server_A). In step 402, SIP Server A issues a call redirection against SIP/presence server C (a.k.a. SIP Server C or SIP_Server_C) during the process of FIGS. 2A-2B to indicate a redirection of calls from SIP Server C to SIP Server A.

In step 404, SIP/presence server B (a.k.a. SIP Server B or SIP_Server_B) receives a login by User B. User C continues to be offline. Using the logic of FIGS. 2A-2B, SIP Server B determines whether or not to contact SIP Server A and SIP Server C. Because SIP Server A already has User A logged on, SIP Server B does not issue call redirection against SIP Server A. Because User C has not yet logged onto SIP Server C, SIP Server B issues a SIP REGISTER message against SIP Server C in step 406 to indicate a redirection of call flow from SIP Server C to SIP Server B.

Following step 406, the process of FIG. 4 is described from the perspective of SIP Server C. SIP Server C includes components analogous to the components of SIP Server 102 shown in FIG. 1. For example, SIP Server C includes a hyperidentity service 407 whose functionality is analogous to the functionality of hyperidentity service 120 (see FIG. 1).

Figure 5:
FIG. 5 depicts an example of a hyperidentity group utilized in profile matching included in the process of FIG. 4, in accordance with embodiments of the present invention.

In step 408, hyperidentity service 407 of SIP Server C retrieves profile details of registered redirection contact addresses (i.e., UserA@SIP_Server_A and UserB@SIP_Server_B). For example, hyperidentity service 407 retrieves the data elements labeled "contact" in the first and second profiles of a hyperidentity group 500, which is included in directory service 112, as shown in FIG. 5.

In step 410, hyperidentity service 407 of SIP Server C retrieves profile details of the current account (i.e., UserC@SIP_Server_C). For example, hyperidentity service 407 retrieves the data element labeled "contact" in the third profile of hyperidentity group 500 (see FIG. 5).

For each redirection contact address resulting from steps 402 and 406, hyperidentity service 407 of SIP Server C performs profile matching in step 412 against UserC@SIP_Server_C to determine which profile corresponding to a redirection contact address is the closest match to the profile of the current account. In one embodiment, the closest match is determined by which profile corresponding to a redirection contact address has the most data elements that match identically labeled data elements in the profile of the current account.

For example, the User A profile in hyperidentity group 500 (see FIG. 5) corresponding to UserA@SIP_Server_A is compared to the User C profile of hyperidentity group 500 (see FIG. 5) corresponding to UserC@SIP_Server_C to determine how closely the User A profile matches the User C profile. Further, the User B profile in hyperidentity group 500 (see FIG. 5) corresponding to UserB@SIP_Server_B is compared to the User C profile to determine how closely the User B profile matches the User C profile. The profile matching of step 412 determines which profile (i.e., User A profile or User B profile) is the closer match to the User C profile. In this example, the User B profile is determined to be the closer match to the User C profile because there are more data elements that match each other between the profiles of User B and User C than between the profiles of User A and User C. The User A profile matches the User C profile in only one data element (i.e., the age of 30 is the same in both the User A profile and the User C profile; see FIG. 5), while the User B profile matches the User C profile in three data elements (i.e., the interest in PC games, the language of English, and the age of 30 are the same in both the User B profile and the User C profile; see FIG. 5).

In step 414, hyperidentity service 407 retains one redirection contact address that is included in the profile associated with the closest match determined in step 412. In step 414, hyperidentity service 407 stores the aforementioned redirection contact address in a manner consistent with how SIP server C stores the contact addresses for all other presentities. In one embodiment, hyperidentity service 407 stores the redirection contact address in step 414 in a memory coupled to SIP server C or in a storage device coupled to SIP server C. Further, in step 414, hyperidentity service 407 removes from storage (e.g., removes from a memory or storage device coupled to SIP server C) another redirection contact address that is included in the profile that was compared in step 412, but was not associated with the closest match determined in step 412. The removed contact address does not receive redirected calls whose original destination is the current account. For example, in step 414, hyperidentity service 407 retains UserB@SIP_Server_B as the redirection contact address that receives redirected calls originally destined for UserC@SIP_Server_C and UserA@SIP_Server_A is removed (i.e., UserA@SIP_Server_A no longer receives redirected calls that had been originally destined for UserC@SIP_Server_C). Following step 414, the process of FIG. 4 ends at step 416.

If User C later logs onto SIP_Server_C (i.e., the presence status of User C changes from offline to online), the redirection address previously set and retained in the process of FIG. 4 is cancelled by the Yes branch of step 222 (see FIG. 2B) and step 224 (see FIG. 2B).

Use Case Scenarios

Figure 6:
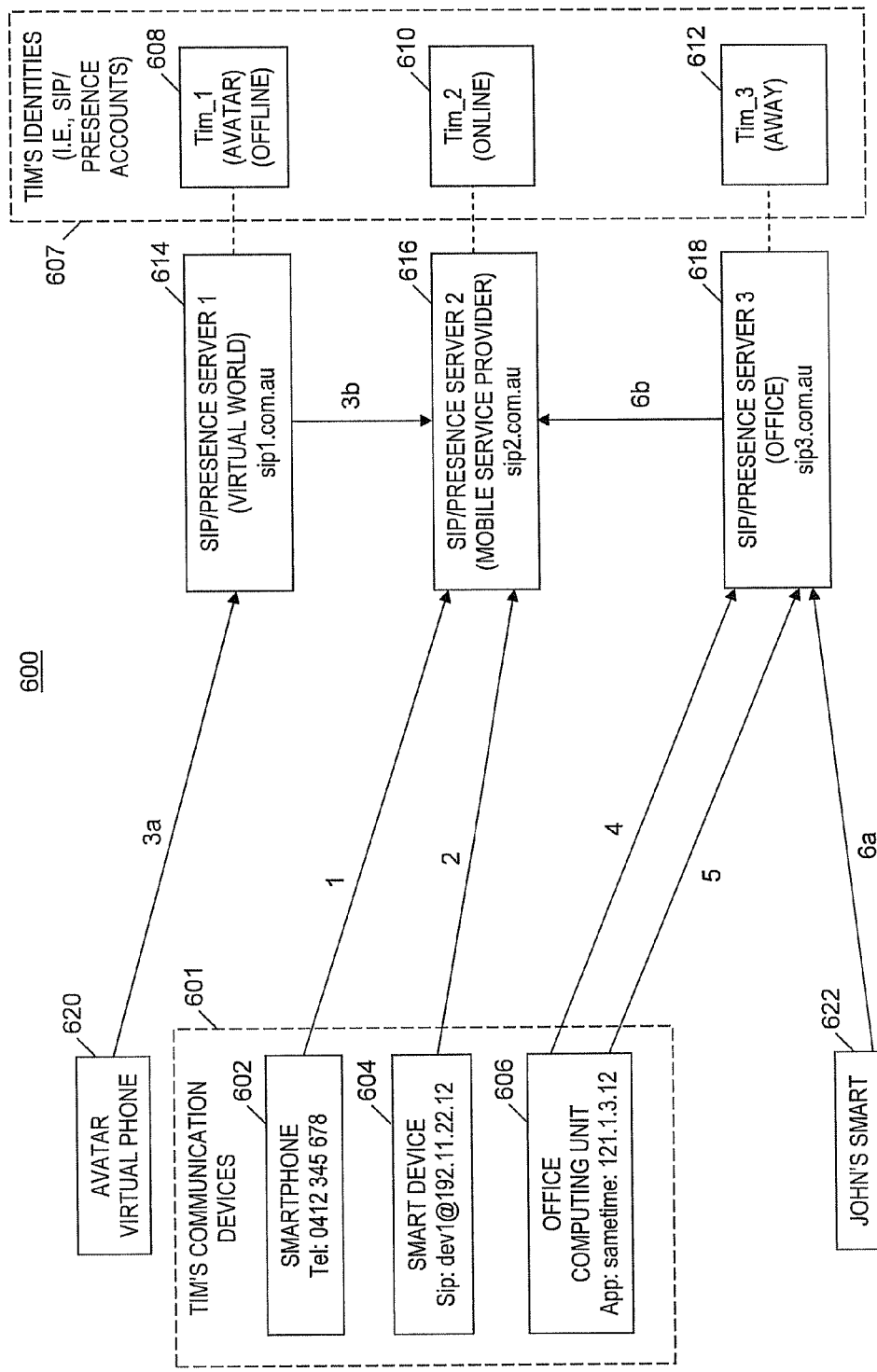
FIG. 6 is a block diagram that depicts use case scenarios that exemplify the process of FIGS. 2A-2B, in accordance with embodiments of the present invention.

FIG. 6 is a block diagram that depicts use case scenarios that exemplify the process of FIGS. 2A-2B, in accordance with embodiments of the present invention. The use case scenarios illustrated by FIG. 6 are related to an end user identified as Tim. System 600 includes Tim's communication devices 601, which include a smartphone 602, a smart device 604 and an office computing unit 606. Smartphone 602 can be contacted via telephone number 0412 345 678. Smart device 604 can be contacted via SIP address dev1@192.11.22.12. Office computing unit 606 can be contacted via the Sametime® address 121.1.3.12. Each of the communication devices 601 is an example of presentity device 104 (see FIG. 1).

System 600 also includes Tim's identities (i.e., SIP/presence accounts) 607, which include a first identity 608 (i.e., Tim_1), a second identity 610 (i.e., Tim_2), and a third identity 612 (i.e., Tim_3). Tim_1 is offline and is associated with a first SIP/presence server 614 (i.e., SIP/presence server 1 or sip1.com.au). Tim_2 is online and is associated with a second SIP/presence server 616 (i.e., SIP/presence server 2 or sip2.com.au). Tim_3 is away and is associated with a third SIP/presence server 618 (i.e., SIP/presence server 3 or sip3.com.au). SIP/presence server 1 provides functionality for a virtual world. SIP/presence server 2 provides functionality for a mobile service provider.

Use case 1: In the first use case, Tim is out of the office and the only means for contacting Tim is through smartphone 602 and smart device 604, which are associated with the Tim_2 identity located on SIP/presence server 2. The presentity corresponding to Tim_2 is online. Tim can elect to route incoming calls destined for Tim's other two identities (i.e., Tim_1 and Tim_3) to Tim_2. Tim pre-configured his resource list to include all three of his identities 607 under a special group called HyperIdentity. A resource list is a feature in a SIP/presence server that is used to store the buddy list. In use case 1, HyperIdentity is reserved as a special group name that identifies hyperidentity group 122 (see FIG. 1).

In step 1 (see the arrow labeled 1 in FIG. 6), Tim registers smartphone 602 against Tim_2. The successful registration in step 1 triggers SIP/presence server 2 to perform auto-subscription for each of Tim's identities 607 in the resource list. SIP/presence server 2 issues SIP SUBSCRIBE messages to each of the identities 607 in the resource list and then receives a result of each SIP SUBSCRIBE message in a presence document formatted according to the PIDF/RPID standard. Each received presence document includes attributes and statuses for one or more devices that are associated with a corresponding identity to which the SIP SUBSCRIBE message was issued by SIP/presence server 2.

Logic provided by hyperidentity service 120 (see FIG. 1) determines whether a presence document generated from an identity included in hyperidentity group 122 (see FIG. 1) indicates that a presentity whose presence status is described by the presence document is offline. If the presentity whose presence status is described by the presence document is offline, the hyperidentity service 120 (see FIG. 1) redirects calls originally destined for the offline presentity to an online presentity corresponding to the SIP/presence server whose SIP SUBSCRIBE messages generated the presence document. In use case 1, the presence document generated from Tim_1 (which is included in HyperIdentity) indicates that a presentity corresponding to Tim_1 is offline (see the Yes branch of step 216 of FIG. 2B). SIP/presence server 2 then issues a SIP REGISTER message to SIP/presence server 1 to re-direct the incoming calls for Tim_1 to Tim_2 (see step 218 of FIG. 2B). A sample SIP REGISTER message to invoke the redirection of calls for Tim_1 to Tim_2 is presented below:

REGISTER sip:sip1.com.au
    From: Tim_2<sip:tim_2@sip2.com.au>;tag=a-tag
    To: Tim_1<sip:tim_1@sip1.com.au>
    . . .
    Contact: tel:0412345678@sip2.com.au The REGISTER header contains the domain of the SIP service for which the registration is meant. The From header displays the address-of-record of the person who is responsible for the registration. The To header contains the address-of-record whose registration is to be created. The Contact field contains the address bindings.

A presence document generated for Tim_3 indicates that a presentity corresponding to Tim_3 is offline. With a SIP REGISTER message similar to the sample SIP REGISTER message presented above, calls destined for Tim_3 are re-directed to Tim_2 (see steps 216 and 218 of FIG. 2B).

In step 2 (see the arrow labeled 2 in FIG. 6), Tim registers smart device 604 against Tim_2. In step 3*a* (see the arrow labeled 3*a* in FIG. 6), an avatar in the virtual world attempts to contact Tim_1 at tim_1@sip1.com.au via a call by virtual phone 620. In step 3*b* (see the arrow labeled 3*b* in FIG. 6), SIP/presence server 1 forwards the call made in step 3*a* to 0412 345 678 according to the aforementioned redirection of calls for Tim_1 to Tim_2.

Use case 2: In use case 2, which follows use case 1, Tim is back in the office and logs onto his Sametime® account, which is provided by his company's SIP/presence server (i.e., SIP/presence server 3). Tim's logon to his Sametime® account uses the Tim_3 identity. Tim_2 continues to be logged on and active and Tim_1 continues to be offline. In step 4 (see the arrow labeled 4 in FIG. 6), Sametime® issues a SIP REGISTER message to SIP/presence server 3 to register Tim_3's additional contact address to be "sametime: 121.1.3.12". A contact address already existed for Tim_3 (i.e., tel: 0412345678) as a result of use case 1. The successful registration to SIP/presence server 3 by Sametime® triggers a SIP PUBLISH message to the presence service component of SIP/presence server 3 to indicate that the presentity corresponding to Tim_3 is online. The presence service component of SIP/presence server 3 detects a status change in the presentity corresponding to Tim_3 (i.e., from offline to online) and then issues a SIP NOTIFY message to Tim_3's subscribers, which include Tim_2. As a result of sending the SIP NOTIFY message, SIP/presence server 2 receives a presence document for Tim_2.

In response to receiving a presence document for Tim_2, the hyperidentity service component of SIP/presence server 2 determines that the received presence document comes from an entity whose user profile is within the HyperIdentity group and that the presence status for the entity has been updated to online (see the Yes branch of step 222 of FIG. 2B). In response to determining that the received presence document comes from an entity whose user profile is within HyperIdentity and that the entity's presence status is updated to be online, SIP/presence server 2 issues an UNREGISTER request in a SIP REGISTER message to SIP/presence server 3 (see step 224 of FIG. 2B). The result of the UNREGISTER request is that an incoming call to Tim__3 now stops being redirected to Tim__2, and instead arrives at sametime: 121.1.3.12.

Since Tim__2 and Tim__3 are now both online, the hyperidentity service component of SIP/presence server 1 performs profile matching (i.e., steps 408, 410, 412 and 414 of FIG. 4) to determine whether calls originally destined for Tim__1 are to be re-directed to Tim__2 or to Tim__3. In use case 3, SIP/presence server 1 corresponds to SIP/presence server C of FIG. 4. In use case 3, step 412 of FIG. 4 determines that the closest profile match relative to Tim__1's profile is Tim__3's profile. Step 414 of FIG. 4 retains the contact address in Tim__3's profile to re-direct the call flow originally destined for Tim__1 to Tim__3.

Use case 3: In use case 3, which follows use case 2, Tim leaves his office to go to a meeting and Tim__3's Sametime® status is updated to be "away." Tim__2 continues to be logged on and active and Tim__1 is offline. In step 5 (see the arrow labeled 5 in FIG. 6), office computing unit 606 publishes the "away" status to SIP/presence server 3. In response to receiving the updated Sametime® status, SIP/presence server 3 sends a SIP NOTIFY message to each of Tim__3's subscribers, which include Tim__2. As a result of sending the SIP NOTIFY message, SIP/presence server 2 receives a presence document that includes the update in Tim__3's Sametime® status.

The hyperidentity service component of the SIP/presence server receiving the presence document determines whether the presence document comes from an entity within the hyperidentity group 122 (see FIG. 1) and if the presence status is updated to "offline" or "away." In use case 3, the hyperidentity service component included in SIP/presence server 2 determines that the presence document comes from an entity within the HyperIdentity group and that the presence status is updated to "away" (see the Yes branch of step 216 of FIG. 2B). The hyperidentity service component of SIP/presence server 2 then issues a SIP REGISTER message to SIP/presence server 3 to redirect calls originally destined for Tim__3 to Tim__2 (see step 218 of FIG. 2B).

In step 6a (see the arrow labeled 6a in FIG. 6), an end user John is attempting to contact Tim__3@sip3.com.au via a call from John's smart device 622. In step 6b (see the arrow labeled 6b in FIG. 6), sip3.com.au forwards the call made in step 6a to 0412 345 678.

Furthermore, the hyperidentity service component included in SIP/presence server 2 determines that a second presence document from the presentity associated with Tim__1 indicates that Tim__1 is offline (see the Yes branch of step 216 of FIG. 2B). The hyperidentity service component of SIP/presence server 2 then issues a SIP REGISTER message to SIP/presence server 1 so that calls that had been previously redirected to Tim__3 (see use case 2) are redirected to Tim__2 (see step 218 of FIG. 2B).

Computing System

Figure 7:
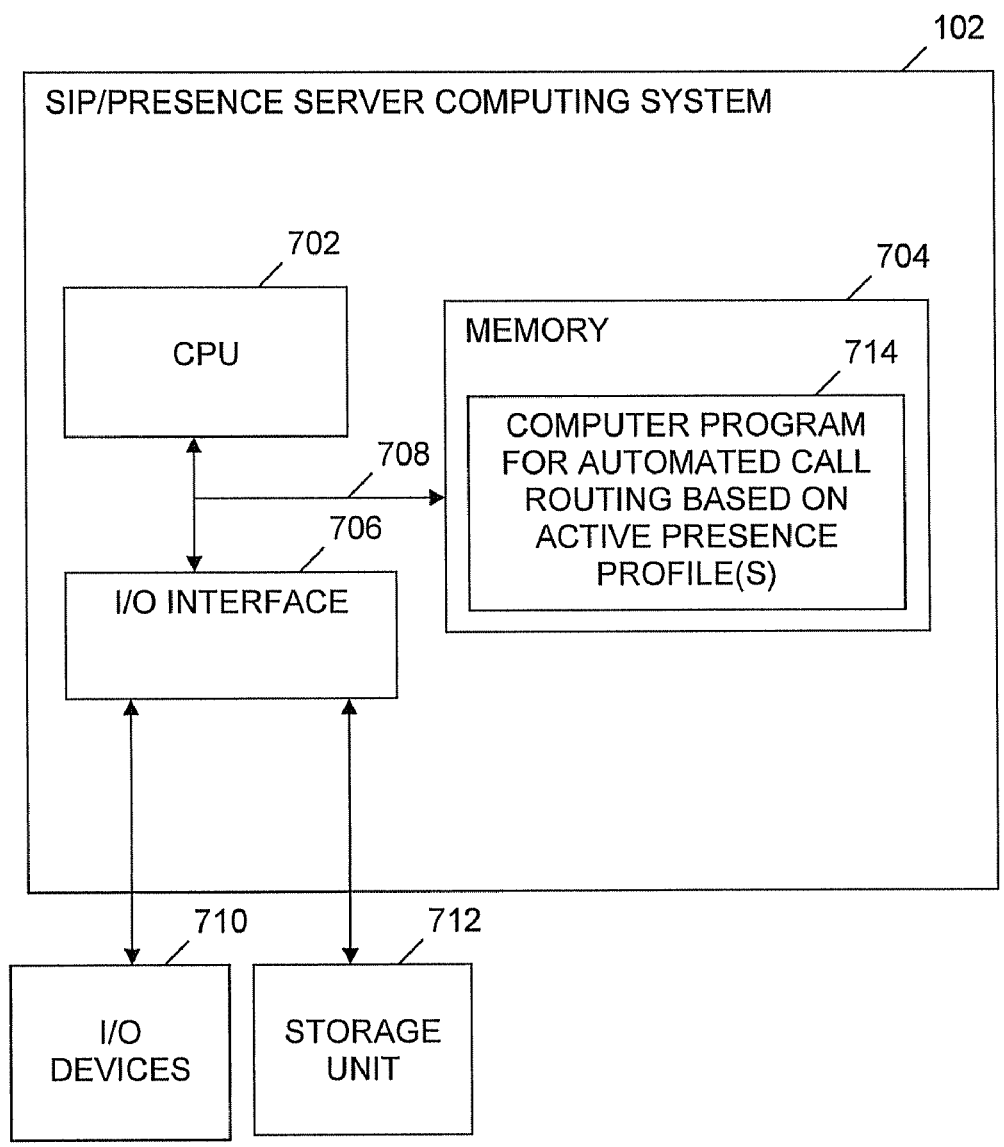
FIG. 7 is a block diagram of a computing system that is included in the system of FIG. 1 and that implements the processes of FIGS. 2A-2B and FIG. 4, in accordance with embodiments of the present invention.

FIG. 7 is a block diagram of a computing system that is included in the system of FIG. 1 and that implements the processes of FIGS. 2A-2B and FIG. 4, in accordance with embodiments of the present invention. SIP/presence server computing system 102 generally comprises a central processing unit (CPU) 702, a memory 704, an input/output (I/O) interface 706, and a bus 708. Further, computing system 102 is coupled to I/O devices 710 and a computer data storage unit 712. CPU 702 performs computation and control functions of computing system 102. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computing system 102, and may comprise any type of transmission link, including electrical, optical, wireless, etc.

I/O interface 706 also allows computing system 102 to store and retrieve information (e.g., program instructions or data) from an auxiliary storage device such as computer data storage unit 712. Computer data storage unit 712 may be a non-volatile storage device, such as a magnetic disk drive (i.e., hard disk drive) or an optical disc drive (e.g., a CD-ROM drive which receives a CD-ROM disk).

Memory 704 includes computer program code 714 that provides the logic for automatically routing calls based on an active presence profile (e.g., the process of FIGS. 2A-2B and/or the process of FIG. 4). In one embodiment, code 714 is executed by hyperidentity service 120 (see FIG. 1). Further, memory 704 may include other systems not shown in FIG. 7, such as an operating system (e.g., Linux) that runs on CPU 702 and provides control of various components within and/or connected to computing system 102.

Hyperidentity group 122 (see FIG. 1) is stored in a computer data storage unit, which may be storage unit 712 or another computer data storage unit (not shown) that is coupled to computing system 102 or to another computing system (not shown).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computing system 102). Furthermore, the present invention may take the form of a computer program product embodied in any tangible medium of expression (e.g., memory 704 or computer data storage unit 712) having computer-usable program code (e.g., code 714) embodied in the medium.

Any combination of one or more computer-usable or computer-readable medium(s) (e.g., memory 704 and computer data storage unit 712) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 714 is printed, as the program 714 can be electronically captured via, for instance, optical scanning of the paper or other medium, then compiled, interpreted, or otherwise processed in a suitable manner, if necessary, and then stored in a computer memory 704. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 714) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 102), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2A-2B and FIG. 4) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 714). These computer program instructions may be provided to a processor (e.g., CPU 702) of a general purpose computer (e.g., computing system 102), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704 or computer data storage unit 712) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of automatically routing calls based on an active presence profile. Thus, the present invention discloses a process for supporting computer infrastructure, comprising integrating, hosting, maintaining and deploying computer-readable code (e.g., code 714) into a computing system (e.g., computing system 102), wherein the code in combination with the computing system is capable of performing a method of automatically routing calls based on an active presence profile.

In another embodiment, the invention provides a business method that performs the process steps of the invention on a subscription, advertising and/or fee basis. That is, a service provider, such as a Solution Integrator, can offer to create, maintain, support, etc. a method of automatically routing calls based on an active presence profile. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and FIG. 4, and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., code 714), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically routing a call to an identity of multiple identities of an end user based on an active presence profile of said end user, comprising:

sending, by a computing system, a subscription message to a plurality of contact addresses of said end user, wherein said plurality of contact addresses includes a plurality of identities of said end user and a plurality of indicators of a plurality of remote server computing systems that manage respective presence-based real time interactive communication systems, wherein each remote server computing system is remote from said computing system;

receiving, by said computing system and from a remote server computing system of said plurality of remote server computing systems, a presence document that includes a presence status of a first identity of said end user, said first identity included in said plurality of identities of said end user;

determining, by said computing system, that said presence status indicates that said first identity of said end user is offline or away;

based on said presence status of said first identity of said end user determined to indicate said first identity to be offline or away, said computing system automatically redirecting said call destined for said first identity to a second identity of said end user by issuing, in response to said determining that said presence status indicates that said first identity of said end user is offline or away, a registration message to said remote server computing system, said second identity included in said plurality of identities of said end user and included in said active presence profile of said end user, wherein said call is from a caller, and wherein said automatically redirecting said call is performed without said caller having knowledge of said call being redirected from said first identity to said second identity of said end user; and based on said automatically redirecting said call destined for said first identity to said second identity of said end user, and based on said second identity being included in said active presence profile of said end user, receiving said redirected call by said computing system associated with said second identity instead of by said remote server computing system associated with said first identity.

2. The method of claim 1, further comprising:

storing, by said computing system and prior to said sending said subscription message, a hyperidentity group in a data storage device, wherein said hyperidentity group includes a plurality of presence profiles of said end user, wherein said plurality of presence profiles includes said plurality of contact addresses of said end user, and wherein said plurality of presence profiles includes said active presence profile of said end user;

subsequent to said storing said hyperidentity group and prior to said sending said subscription message to said plurality of contact addresses of said end user, said computing system determining said buddy list of said end user includes a reserved group name that indicates said hyperidentity group, wherein said sending said subscription message includes said computing system sending said subscription message to said plurality of contact addresses based on said buddy list being determined to include said reserved group name that indicates said hyperidentity group, and based on said hyperidentity group including said plurality of presence profiles that includes said plurality of contact addresses, and wherein said automatically redirecting said call destined for said first identity to said second identity of said end user is further based on said hyperidentity group including said first and second identities of said end user, said first identity included in a first contact address of said plurality of contact addresses and said second identity included in a second contact address of said plurality of contact addresses.

3. The method of claim 1, wherein said sending said subscription message includes sending a Session Initiation Protocol (SIP) SUBSCRIBE message to said plurality of contact addresses of said end user, and wherein said issuing said registration message includes issuing a SIP REGISTER message to said remote server computing system.

4. The method of claim 1, wherein said determining that said presence status indicates that said first identity of said end user is offline or away includes determining that said presence status indicates that said first identity changed from online to offline or changed from active to away.

5. The method of claim 1, further comprising:

initiating, by said computing system, a redirection of all calls destined for said first identity to said second identity of said end user;

receiving, by said computing system, from said remote server computing system, and subsequent to said receiving said call, a second presence document that includes a second presence status of said first identity;

determining, by said computing system, that said second presence status indicates that said first identity of said plurality of identities changed from offline to online or changed from away to active; and in response to said determining that said second presence status indicates that said first identity changed from offline to online or changed from away to active, said computing system canceling said redirection of all calls destined for said first identity to said second identity of said end user so that calls destined for said first identity are not redirected to any other identity of said end user, wherein said canceling said redirection includes said computing system issuing a second registration message.

6. The method of claim 1, wherein said receiving said call is performed in a presence-based real time interactive communication system managed by said computing system, and wherein said presence-based real time interactive communication system managed by said computing system is different from any presence-based real time interactive communication system included in said presence-based real time interactive communication systems managed by said plurality of remote server computing systems.

7. A computer system comprising:

a central processing unit (CPU);

a memory coupled to said CPU;

a computer-readable, tangible storage device coupled to said CPU, said storage device containing instructions that when executed by said CPU via said memory implement a method of automatically routing a call to an identity of multiple identities of an end user based on an active presence profile of said end user, said method comprising:

said computer system sending a subscription message to a plurality of contact addresses of said end user, wherein said plurality of contact addresses includes a plurality of identities of said end user and a plurality of indicators of a plurality of remote server computing systems that manage respective presence-based real time interactive communication systems, wherein each remote server computing system is remote from said computer system;

said computer system receiving, from a remote server computing system of said plurality of remote server computing systems, a presence document that includes a presence status of a first identity of said end user, said first identity included in said plurality of identities of said end user;

said computer system determining that said presence status indicates that said first identity of said end user is offline or away;

based on said presence status of said first identity of said end user determined to indicate said first identity to be offline or away, said computer system automatically redirecting said call destined for said first identity to a second identity of said end user by issuing, by said computer system and in response to said determining that said presence status indicates that said first identity of said end user is offline or away, a registration message to said remote server computing system, said second identity included in said plurality of identities of said end user and included in said active presence profile of said end user, wherein said call is from a caller, and wherein said automatically redirecting said call is performed without said caller having knowledge of said call being redirected from said first identity to said second identity of said end user; and based on said automatically redirecting said call destined for said first identity to said second identity of said end user, and based on said second identity being included in said active presence profile of said end user, said computer system receiving said redirected call by said computer system associated with said second identity instead of by said remote server computing system associated with said first identity.

8. The system of claim 7, wherein said method further comprises:

said computer system storing, prior to said sending said subscription message, a hyperidentity group in a data storage device, wherein said hyperidentity group includes a plurality of presence profiles of said end user, wherein said plurality of presence profiles includes said plurality of contact addresses of said end user, and wherein said plurality of presence profiles includes said active presence profile of said end user;

subsequent to said storing said hyperidentity group and prior to said sending said subscription message to said plurality of contact addresses of said end user, said computer system determining said buddy list of said end user includes a reserved group name that indicates said hyperidentity group, wherein said sending said subscription message includes said computer system sending said subscription message to said plurality of contact addresses based on said buddy list being determined to include said reserved group name that indicates said hyperidentity group, and based on said hyperidentity group including said plurality of presence profiles that includes said plurality of contact addresses, and wherein said automatically redirecting said call destined for said first identity to said second identity of said end user is further based on said hyperidentity group including said first and second identities of said end user, said first identity included in a first contact address of said plurality of contact addresses and said second identity included in a second contact address of said plurality of contact addresses.

9. The system of claim 7, wherein said sending said subscription message includes sending a Session Initiation Protocol (SIP) SUBSCRIBE message to said plurality of contact addresses of said end user, and wherein said issuing said registration message includes issuing a SIP REGISTER message to said remote server computing system.

10. The system of claim 7, wherein said determining that said presence status indicates that said first identity of said end user is offline or away includes determining that said presence status indicates that said first identity changed from online to offline or changed from active to away.

11. The system of claim 7, wherein said method further comprises:

initiating, by said computer system, a redirection of all calls destined for said first identity to said second identity of said end user;

said computer system receiving, from said remote server computing system and subsequent to said receiving said call, a second presence document that includes a second presence status of said first identity;

said computer system determining that said second presence status indicates that said first identity of said plurality of identities changed from offline to online or changed from away to active; and in response to said determining that said second presence status indicates that said first identity changed from offline to online or changed from away to active, said computer system canceling said redirection of all calls destined for said first identity to said second identity of said end user so that calls destined for said first identity are not redirected to any other identity of said end user, wherein said canceling said redirection includes said computer system issuing a second registration message.

12. A computer program product, comprising:

a computer-readable, tangible storage device having a computer-readable program code stored therein, said computer-readable program code containing instructions that when executed by a processor of a computer system implement a method of automatically routing a call to an identity of multiple identities of an end user based on an active presence profile of said end user, said method comprising:

said computer system sending a subscription message to a plurality of contact addresses of said end user, wherein said plurality of contact addresses includes a plurality of identities of said end user and a plurality of indicators of a plurality of remote server computing systems that manage respective presence-based real time interactive communication systems, wherein each remote server computing system is remote from said computer system;

said computer system receiving, from a remote server computing system of said plurality of remote server computing systems, a presence document that includes a presence status of a first identity of said end user, said first identity included in said plurality of identities of said end user;

said computer system determining that said presence status indicates that said first identity of said end user is offline or away;

based on said presence status of said first identity of said end user determined to indicate said first identity to be offline or away, said computing system automatically redirecting said call destined for said first identity to a second identity of said end user by issuing, in response to said determining that said presence status indicates that said first identity of said end user is offline or away, a registration message to said remote server computing system, said second identity included in said plurality of identities of said end user and included in said active presence profile of said end user, wherein said call is from a caller, and wherein said automatically redirecting said call is performed without said caller having knowledge of said call being redirected from said first identity to said second identity of said end user; and based on said automatically redirecting said call destined for said first identity to said second identity of said end user, and based on said second identity being included in said active presence profile of said end user, said computer system receiving said redirected call associated with said second identity instead of by said remote server computing system associated with said first identity.

13. The program product of claim 12, wherein said method further comprises:

said computer system storing, prior to said sending said subscription message, a hyperidentity group in a data storage device, wherein said hyperidentity group includes a plurality of presence profiles of said end user, wherein said plurality of presence profiles includes said plurality of contact addresses of said end user, and wherein said plurality of presence profiles includes said active presence profile of said end user;

subsequent to said storing said hyperidentity group and prior to said sending said subscription message to said plurality of contact addresses of said end user, said computer system determining said buddy list of said end user includes a reserved group name that indicates said hyperidentity group, wherein said sending said subscription message includes said computer system sending said subscription message to said plurality of contact addresses based on said buddy list being determined to include said reserved group name that indicates said hyperidentity group, and based on said hyperidentity group including said plurality of presence profiles that includes said plurality of contact addresses, and wherein said automatically redirecting said call destined for said first identity to said second identity of said end user is further based on said hyperidentity group including said first and second identities of said end user, said first identity included in a first contact address of said plurality of contact addresses and said second identity included in a second contact address of said plurality of contact addresses.

14. The program product of claim 12, wherein said sending said subscription message includes sending a Session Initiation Protocol (SIP) SUBSCRIBE message to said plurality of contact addresses of said end user, and wherein said issuing said registration message includes issuing a SIP REGISTER message to said remote server computing system.

15. The program product of claim 12, wherein said determining that said presence status indicates that said first identity of said end user is offline or away includes determining that said presence status indicates that said first identity changed from online to offline or changed from active to away.

16. The program product of claim 12, wherein said method further comprises:

initiating, by said computer system, a redirection of all calls destined for said first identity to said second identity of said end user;

receiving, from said remote server computing system and subsequent to said receiving said call, a second presence document that includes a second presence status of said first identity;

determining that said second presence status indicates that said first identity of said plurality of identities changed from offline to online or changed from away to active; and in response to said determining that said second presence status indicates that said first identity changed from offline to online or changed from away to active, said computer system canceling said redirection of all calls destined for said first identity to said second identity of said end user so that calls destined for said first identity are not redirected to any other identity of said end user, wherein said canceling said redirection includes said computer system issuing a second registration message.

17. A process for supporting computing infrastructure, said process comprising:

a first computer system providing at least one support service for at least one of creating, integrating, hosting, maintaining, and deploying computer-readable code in a second computer system, the computer-readable code containing instructions, wherein the instructions, when carried out by a processor of the second computer system, implement a method of automatically routing a call to an identity of multiple identities of an end user based on an active presence profile of said end user, said method comprising:

said second computer system sending a subscription message to a plurality of contact addresses of said end user, wherein said plurality of contact addresses includes a plurality of identities of said end user and a plurality of indicators of a plurality of remote server computing systems that manage respective presence-based real time interactive communication systems, wherein each remote server computing system is remote from said second computer system;

said second computer system receiving, from a remote server computing system of said plurality of remote server computing systems, a presence document that includes a presence status of a first identity of said end user, said first identity included in said plurality of identities of said end user;

determining that said presence status indicates that said first identity of said end user is offline or away;

based on said presence status of said first identity of said end user determined to indicate said first identity to be offline or away, said second computer system automatically redirecting said call destined for said first identity to a second identity of said end user by issuing, in response to said determining that said presence status indicates that said first identity of said end user is offline or away, a registration message to said remote server computing system, said second identity included in said plurality of identities of said end user and included in said active presence profile of said end user, wherein said call is from a caller, and wherein said automatically redirecting said call is performed without said caller having knowledge of said call being redirected from said first identity to said second identity of said end user; and based on said automatically redirecting said call destined for said first identity to said second identity of said end user, and based on said second identity being included in said active presence profile of said end user, receiving said redirected call by said second computer system associated with said second identity instead of by said remote server computing system associated with said first identity.

18. The process of claim 17, wherein said method further comprises:
- said second computer system storing, prior to said sending said subscription message, a hyperidentity group in a data storage device, wherein said hyperidentity group includes a plurality of presence profiles of said end user, wherein said plurality of presence profiles includes said plurality of contact addresses of said end user, and wherein said plurality of presence profiles includes said active presence profile of said end user,
- subsequent to said storing said hyperidentity group and prior to said sending said subscription message to said plurality of contact addresses of said end user, said second computer system determining said buddy list of said end user includes a reserved group name that indicates said hyperidentity group,
- wherein said sending said subscription message includes said second computer system sending said subscription message to said plurality of contact addresses based on said buddy list being determined to include said reserved group name that indicates said hyperidentity group, and based on said hyperidentity group including said plurality of presence profiles that includes said plurality of contact addresses, and
- wherein said automatically redirecting said call destined for said first identity to said second identity of said end user is further based on said hyperidentity group including said first and second identities of said end user, said first identity included in a first contact address of said plurality of contact addresses and said second identity included in a second contact address of said plurality of contact addresses.

19. The process of claim 17, wherein said sending said subscription message includes sending a Session Initiation Protocol (SIP) SUBSCRIBE message to said plurality of contact addresses of said end user, and wherein said issuing said registration message includes issuing a SIP REGISTER message to said remote server computing system.

20. The process of claim 17, wherein said determining that said presence status indicates that said first identity of said end user is offline or away includes determining that said presence status indicates that said first identity changed from online to offline or changed from active to away.

21. The process of claim 17, wherein said method further comprises:
- initiating, by said second computer system, a redirection of all calls destined for said first identity to said second identity of said end user;
- receiving, from said remote server computing system and subsequent to said receiving said call, a second presence document that includes a second presence status of said first identity;
- determining that said second presence status indicates that said first identity of said plurality of identities changed from offline to online or changed from away to active; and
- in response to said determining that said second presence status indicates that said first identity changed from offline to online or changed from away to active, said computer system canceling said redirection of all calls destined for said first identity to said second identity of said end user so that calls destined for said first identity are not redirected to any other identity of said end user, wherein said canceling said redirection includes said computer system issuing a second registration message.

22. A computer-implemented method of automatically routing calls to an identity of an end user based on an active presence profile selected from multiple active presence profiles, said method comprising:
- a computing system determining a first identity of said end user and a second identity of said end user are offline, said computing system managing a presence-based real time interactive communication system;
- said computing system determining a third identity of said end user is online, said first, second and third identities included in a plurality of identities of said end user;
- based on said first identity of said end user determined to be offline and based on said third identity of said end user determined to be online, said computing system automatically redirecting one or more calls destined for said first identity to said third identity by utilizing a contact address that is included in said third profile and that includes said third identity;
- subsequent to said automatically redirecting one or more calls to said third identity, said computing system determining said second identity changes from being offline to being online;
- subsequent to said determining said second identity changes from being offline to being online, based on said first identity of said end user determined to be offline and based on said second identity of said end user determined to be online, said computing system initiating a redirection of a call flow destined for said first identity to said second identity by registering a contact address that is included in said second profile and that includes said second identity;
- based on said automatically redirecting said one or more calls to said third identity and based on said initiating said redirection of said call flow to said second identity, retrieving, by said computing system, a first set of details of a first profile, a second set of details of a second profile, and a third set of details of a third profile, wherein said first profile describes a plurality of attributes of said first identity of said end user, wherein said second profile describes a plurality of attributes of said second identity of said end user, wherein said third profile describes a plurality of attributes of said third identity of said end user, and wherein said second profile and said third profile are active presence profiles of said end user;
- subsequent to said retrieving said first, second and third sets of details, said computing system determining a first measure of similarity between said first and second sets of details by comparing said first set of details to said second set of details by said computing system;
- subsequent to said retrieving said first, second and third sets of details, said computing system determining a second measure of a similarity between said first and third sets of details by comparing said first set of details to said third set of details by said computing system;
- said computing system determining that said first set of details is more similar to said second set of details than to said third set of details by determining said first measure of said similarity between said first and second sets of details is greater than said second measure of said similarity between said first and third sets of details;
- in response to said determining said first set of details is more similar to said second set of details than to said third set of details, said computing system retaining in a storage device said contact address that is included in said second profile and that includes said second identity, and removing from said storage device said contact address that is included in said third profile and that includes said third identity; and based on said first set of details being more similar to said second set of details than to said third set of details and based on said contact address included in said second profile being retained in said storage device and said contact address included in said third profile being removed from said storage device, said computing system routing a call originally destined for said first identity to said second identity by utilizing said retained contact address included in said second profile, instead of redirecting said call to said third identity by performing said automatically redirecting said one or more calls by utilizing said contact address included in said third profile.

* * * * *